Patented Jan. 12, 1932

1,840,815

UNITED STATES PATENT OFFICE

JOHN JENSEN, OF ELLENDALE, NORTH DAKOTA

COMPOSITION AND METHOD OF MAKING A BELT DRESSING

No Drawing. Application filed May 10, 1929. Serial No. 362,139.

This invention relates to a composition and method of making a belt dressing and an object of the invention is to provide a very simple method of mixing the ingredients of a belt dressing, that requires the minimum of apparatus and is free of technical skill and control in carrying out the method.

Another object of the invention is to provide a composition which may be utilized in preserving the life of a belt, that is waterproof, and that is fire-resistant to temperatures which would consume the belt itself.

Another object of the invention is to provide a belt dressing of the character referred to that increases the friction between the belt and pulley so that less tension is necessary on the belt thereby eliminating strain on the pulley bearings.

With the foregoing and other objects in view, the invention consists in the novel method and composition of matter which is very simple in its operation and as will be more specifically described and illustrated in the following specification, but it is to be understood that changes, variations, and modifications, may be resorted to, without departing from the spirit of the claim hereunto appended.

In carrying out the method and forming the composition in accordance with the present invention, discarded inner tubes or other forms of vulcanized rubber are to be shredded or utilized in larger pieces depending upon the size of the melting vat used in the process. The vulcanized rubber is placed in an open vat and heated under atmospheric pressure until the consistency of the rubber assumes a condition of viscosity between a fluid and semi-fluid. The range of temperature has been found by experiment to run between four hundred and five hundred degrees Fahrenheit.

Any suitable means may be used to increase the temperature, but it is to be borne in mind that the heat must be applied slowly so that the upper range of temperature may be controlled, in order that the heating may not be carried too far.

When the vulcanized rubber reaches the aforementioned consistency, a suitable amount of wintergreen oil is added to destroy the offensive odor of the rubber in its finished state. When the rubber has reached a viscosity between a fluid or a semi-fluid or plastic condition and the essential oil has been incorporated thoroughly by stirring or other means, the heat is removed and the mass is allowed to cool under normal conditions until it reaches atmospheric temperature. When the mass has cooled to atmospheric temperature, it will be found that the mass has a consistency of a plastic material, capable of being discharged from a collapsible tube and may be dispensed in a manner similar to tooth paste. It is the desire of the applicant to merchandise the belt dressing in accordance with this invention in a collapsible tube for small merchandising while the composition lends itself to packing in cans, barrels or other like containers.

It will thus be seen that waste products such as old inner tubes or other vulcanized rubber products which have very little utility after serving their original purpose are utilized by this process and formed into a novel compound which is very reliable in its application.

The belt dressing in accordance with this invention may be applied to leather, rubber or canvas belts and will adhere to the surface of leather and all belting material without clogging the pores of the material and will not penetrate beyond the surface of the belt, thereby eliminating any possibility of causing a disintegration of the belt itself. The composition has been tested for its fire resisting qualities and it has been found that it will not burn at any lower temperature than the belt itself.

Having described my invention, what I claim is:

A method of making a belt dressing comprising heating vulcanized rubber between four hundred and five hundred degrees Fahrenheit to a plastic but not liquid state, incorporating an oil of wintergreen by thorough mixing, and allowing the mass to cool to atmospheric temperatures.

In testimony whereof I affix my signature.

JOHN JENSEN.